US012811027B2

(12) United States Patent
Holcombe

(10) Patent No.: US 12,811,027 B2
(45) Date of Patent: Nov. 24, 2026

(54) HIGH ANNEALING TEMPERATURE TREE WIRE

(71) Applicant: Southwire Company, LLC, Carrollton, GA (US)

(72) Inventor: Charles Holcombe, Newnan, GA (US)

(73) Assignee: Southwire Company, LLC, Carrollton, GA (US)

( * ) Notice: Subject to any disclaimer, the term of this patent is extended or adjusted under 35 U.S.C. 154(b) by 341 days.

(21) Appl. No.: 18/354,065

(22) Filed: Jul. 18, 2023

(65) Prior Publication Data

US 2024/0021339 A1 Jan. 18, 2024

Related U.S. Application Data

(60) Provisional application No. 63/368,707, filed on Jul. 18, 2022.

(51) Int. Cl.

*H01B 7/00* (2006.01)
*H01B 1/02* (2006.01)
*H01B 3/30* (2006.01)
*H01B 7/02* (2006.01)
*H01B 13/06* (2006.01)

(52) U.S. Cl.

CPC ........... *H01B 7/0018* (2013.01); *H01B 1/023* (2013.01); *H01B 3/307* (2013.01); *H01B 7/0225* (2013.01); *H01B 13/06* (2013.01)

(58) Field of Classification Search

None

See application file for complete search history.

(56) References Cited

U.S. PATENT DOCUMENTS 4,010,121 A * 3/1977 Walch ........................ G01K 7/22 252/521.1
4,097,686 A * 6/1978 Gladenbeck ........... H01B 5/105 174/113 C
5,057,673 A * 10/1991 Farkas .................... H01C 7/027 219/549
9,190,184 B2 * 11/2015 Nelson .................... H01B 3/427
2004/0182597 A1 * 9/2004 Smith ..................... H01B 5/105 174/126.1

(Continued)

FOREIGN PATENT DOCUMENTS

RU 99650 U1 * 11/2010

OTHER PUBLICATIONS

Aluminum Electrical Conductor Handbook, Emergency Loading and Vibration and Fatigue of Overhead Conductors, pp. 6-10-6-11 (Third Edition 1989).

(Continued)

*Primary Examiner* — Krystal Robinson

(74) *Attorney, Agent, or Firm* — Merchant & Gould P.C.

(57) ABSTRACT

High annealing temperature tree wire may be provided. The high annealing temperature tree wire may compromise a conductor core, a plurality of conductor strands, and at least one covering layer. The conductor core may comprise a first material. The plurality of conductor strands may be wrapped around the conductor core. The plurality of conductor strands may comprise a second material. The second material may anneal at a temperature above an operating temperature range of the electrical conductor. The at least one covering layer may be disposed around the plurality of conductor strands.

22 Claims, 4 Drawing Sheets

(56) References Cited

U.S. PATENT DOCUMENTS

| | | | | |
|---|---|---|---|---|
| 2010/0038112 | A1* | 2/2010 | Grether | H01B 13/0006 174/128.1 |
| 2010/0059249 | A1* | 3/2010 | Powers | H01B 5/104 174/128.1 |
| 2012/0241194 | A1* | 9/2012 | Powers | H01B 1/023 174/128.1 |
| 2014/0041925 | A1* | 2/2014 | Davis | H01B 7/29 174/40 R |
| 2014/0251653 | A1* | 9/2014 | Lancaster | H01B 5/102 174/128.1 |
| 2015/0194240 | A1* | 7/2015 | Ranganathan | H01B 7/292 427/117 |
| 2016/0343476 | A1* | 11/2016 | Mhetar | B05D 7/20 |
| 2017/0110704 | A1* | 4/2017 | Siripurapu | B23K 35/40 |
| 2018/0118952 | A1* | 5/2018 | Ranganathan | C09D 5/22 |
| 2021/0134474 | A1* | 5/2021 | Holcombe | H01B 1/02 |

OTHER PUBLICATIONS

Standard for Weather Reistant Polyethelene Covered Conductors, ANSI/ICEA S-70-547-2016, Insulated Cable Engineers Association, Inc., 29 pages (Copyright 2016).

Standard Specification for Heat Resistant Aluminum-Zirconium Alloy Wire for Electrical Purposes, Designation: B941-10, ASTM International, 4 pages (May 17, 2013).

* cited by examiner

HIGH ANNEALING TEMPERATURE TREE WIRE

CROSS-REFERENCE TO RELATED APPLICATION

This application claims a benefit of priority to U.S. Provisional Application No. 63/368,707, filed Jul. 18, 2022, which is hereby incorporated by reference herein, in its entirety.

BACKGROUND

Over the last several years, both the frequency and intensity of wildfires in the Western United States have been on the rise. Often times, these fires are started by intermittent contact between overhead electrical power lines and surrounding vegetation. Less frequently, wildfires are started by contact between overhead electrical power lines and wildlife. Wildfires started in this manner have led to the loss of hundreds of lives, thousands of homes, and billions of dollars of economic value. Electrical utilities are routinely blamed for these losses, and the ensuing liability has led to the financial ruin of numerous companies.

To prevent wildfires started by electrical power infrastructure, utilities have taken two general approaches: first, when weather conditions increase the likelihood of wildfire initiation, utilities have begun de-energizing their system, turning off power to millions of individuals for an extended period of time. The second mitigation approach involves the hardening of the electrical transmission and distribution systems through extensive vegetation management and the use of materials that are less likely to initiate wildfires.

The most common approach used by utilities is to replace bare overhead distribution conductors with a covered conductor referred to as "tree wire". The insulating material used in tree wire significantly reduces the chance of wildfire initiation when there is intermittent contact between the electrical conductors and surrounding vegetation. Utilities are actively replacing bare distribution conductor with tree wire to improve their wildfire initiation posture.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
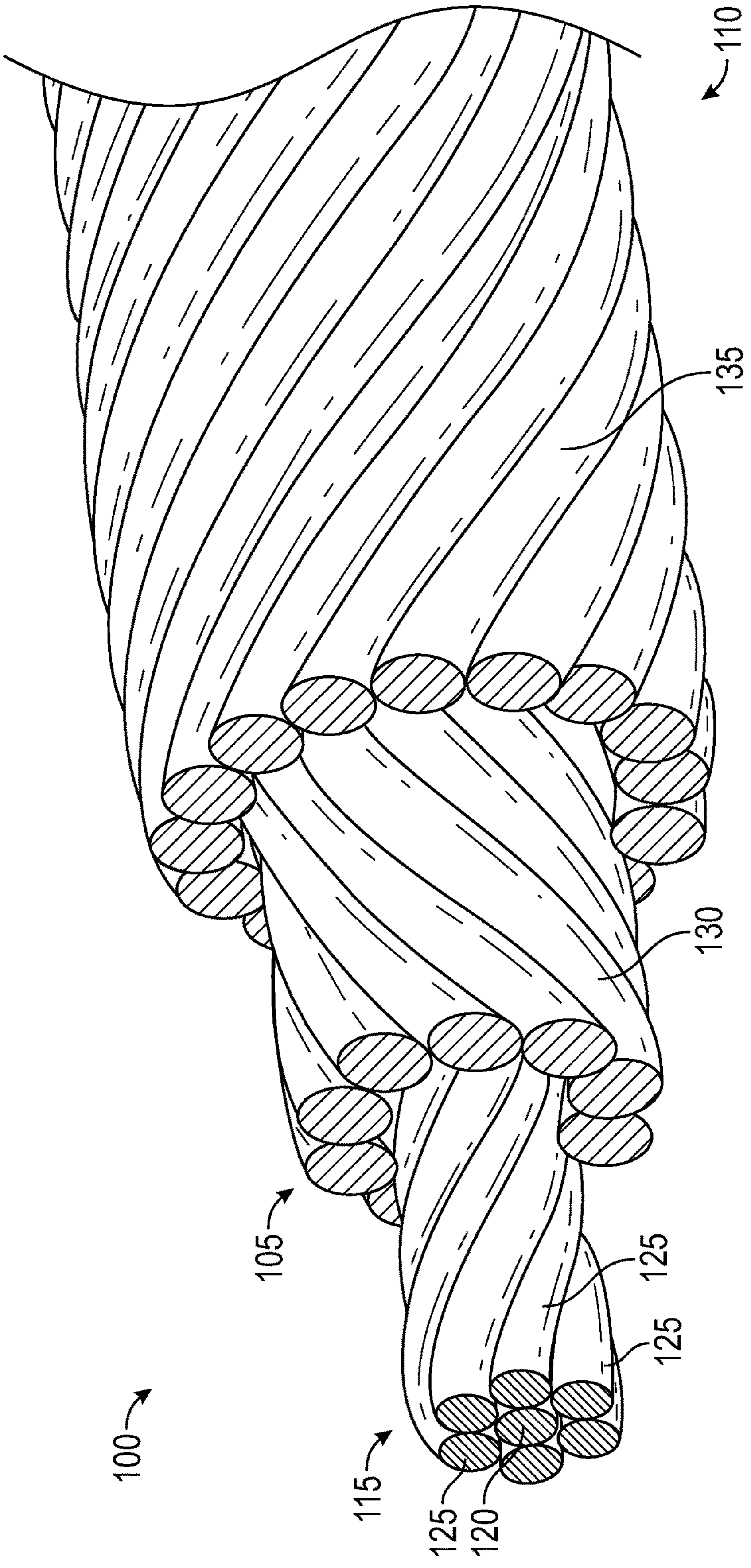
FIG. 1 shows an aluminum conductor steel reinforced (ACSR) conductor.

High annealing temperature tree wire may be provided. The high annealing temperature tree wire may compromise a conductor core, a plurality of conductor strands, and at least one covering layer. The conductor core may comprise a first material. The plurality of conductor strands may be wrapped around the conductor core. The plurality of conductor strands may comprise a second material. The second material may anneal at a temperature above an operating temperature range of the electrical conductor. The at least one covering layer may be disposed around the plurality of conductor strands.

Both the foregoing overview and the following example embodiments are examples and explanatory only and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

"Concentric-Lay-Stranded Conductor" is a conductor comprising a center core surrounded by one or more layers of helically wound conductor wires. The conductor's "lay" may refer to the length and direction of strands in layers comprising the conductor. The lay length may comprise the axial length of one complete revolution of a helical strand. The lay direction may be defined as right-hand or left-hand, referring to the individual strands' wrap direction as viewed axially in a direction away from an observer. Consistent with embodiments of the disclosure, the conductor may comprise, for example, a homogeneous or a non-homogeneous material. Individual strands comprising the conductor may be, but not limited to, round or trapezoidal-shaped.

FIG. 1 shows an Aluminum Conductor Steel Reinforced (ACSR) conductor 100 consistent with embodiments of the disclosure. ACSR conductor 100 may comprise a high-capacity, high-strength stranded conductor used, for example, in overhead power lines. Conductor 100 may include a first conductor layer 105, a second conductor layer 110, and a core 115. Core 115 may comprise a center strand 120 with outer core strands 125 helical wrapped around center strand 120. Consistent with embodiments of the disclosure, core 115 may comprise one single solid strand. Second conductor layer 110 may be helical wrapped around first conductor layer 105. First conductor layer 105 may be helical wrapped around core 115. First conductor layer 105 and second conductor layer 110 may be wrapped in respective alternating hand lay. First conductor layer 105 and a second conductor layer 110 may comprise conductor strands that have a trapezoidal cross-sectional shape. Moreover, first conductor layer 105 and a second conductor layer 110 may comprise conductor strands that are compacted.

First conductor layer 105 may comprise first conductor layer strands 130. Second conductor layer 110 may comprise second conductor layer strands 135. First conductor layer strands 130 and second conductor layer strands 135 may be considered conductor strands. Center strand 120 and outer core strands 125 may be considered core strands. First conductor layer strands 130 and second conductor layer strands 135 may comprise aluminum or an aluminum alloy (e.g., aluminum zirconium alloy) that may be chosen for aluminum's high conductivity, low weight, and low cost. Outer core strands 125 and center strand 120 may comprise steel (e.g., High Strength (HS) steel, HS 285 steel, or Class A galvanized steel, Ultra-High Strength Steel (UHS/HS285), Standard Strength Steel), providing strength to conductor 100.

When core 115 is steel, steel's lower electrical conductivity may have a minimal effect on conductor 100's overall current-carrying capacity. This is because, due to the "skin effect", conductor 100's current may be carried mostly by first conductor layer 105 and second conductor layer 110, with core 115 carrying very little current. Because first conductor layer 105 and second conductor layer 110 may comprise relatively low resistance aluminum, core 115's higher resistance may be immaterial. As described in greater detail below, consistent with embodiments of the disclosure, the conductor strands may be made of a material that may allow conductor 100 to take better advantage of the conductor strands' lack of a long-term strength loss because the annealing temperature of the conductor strands may be much greater than the emergency operating temperature of conductor 100. This material may comprise, but is not limited to, aluminum zirconium alloy and may comprise between 0.20% and 0.33% zirconium inclusively. Conductor 100 may comprise a number of conductor layers comprising any number of conductor strands. Furthermore, conductor 100 may comprise a number of core layers comprising any number of core strands. The conductor strands and the core strands may comprise any shape (i.e., trapezoidal) and may comprise compressed wire.

Figure 2A:
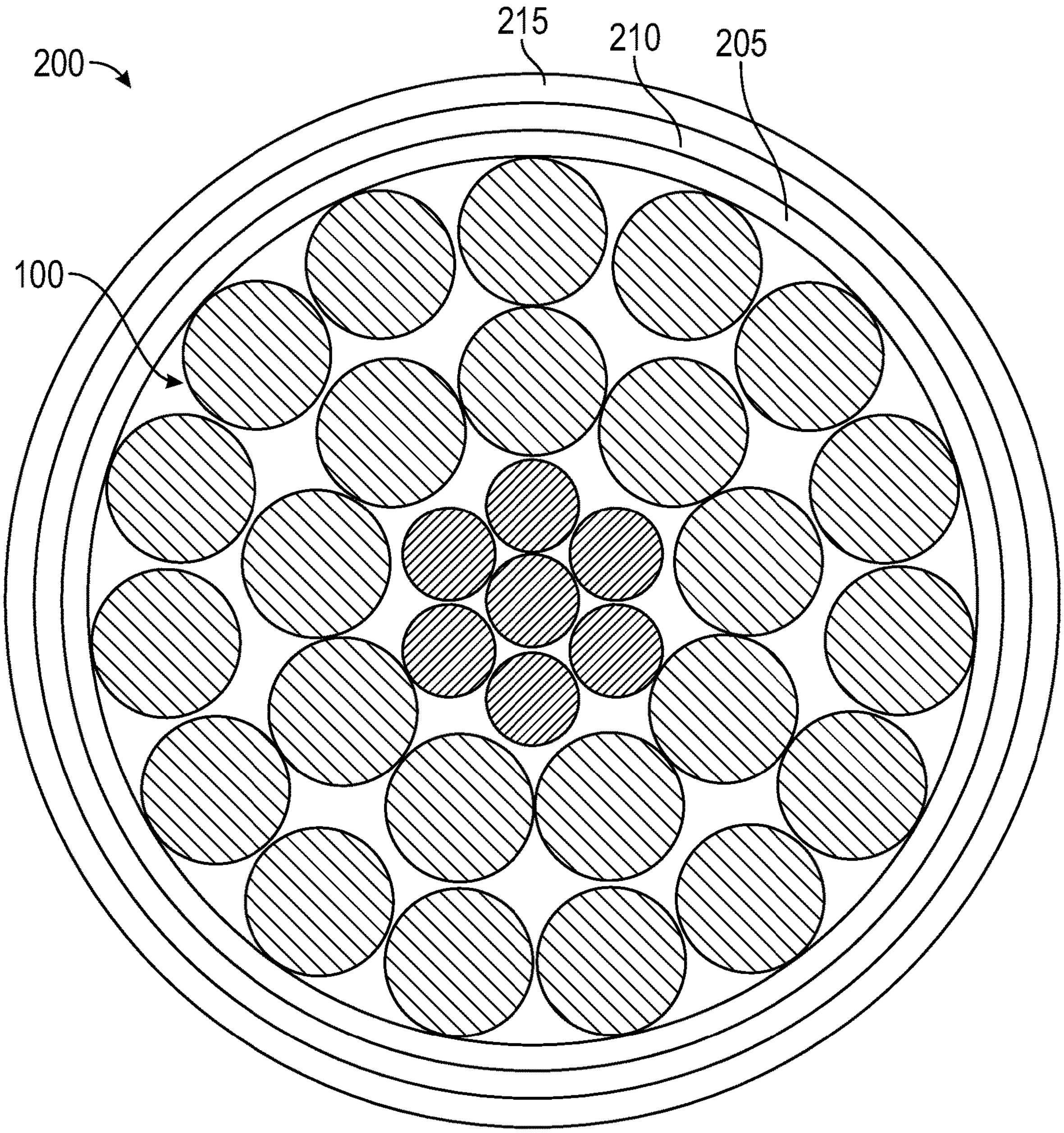
FIG. 2A shows a tree wire with a stranded core.
Figure 2B:
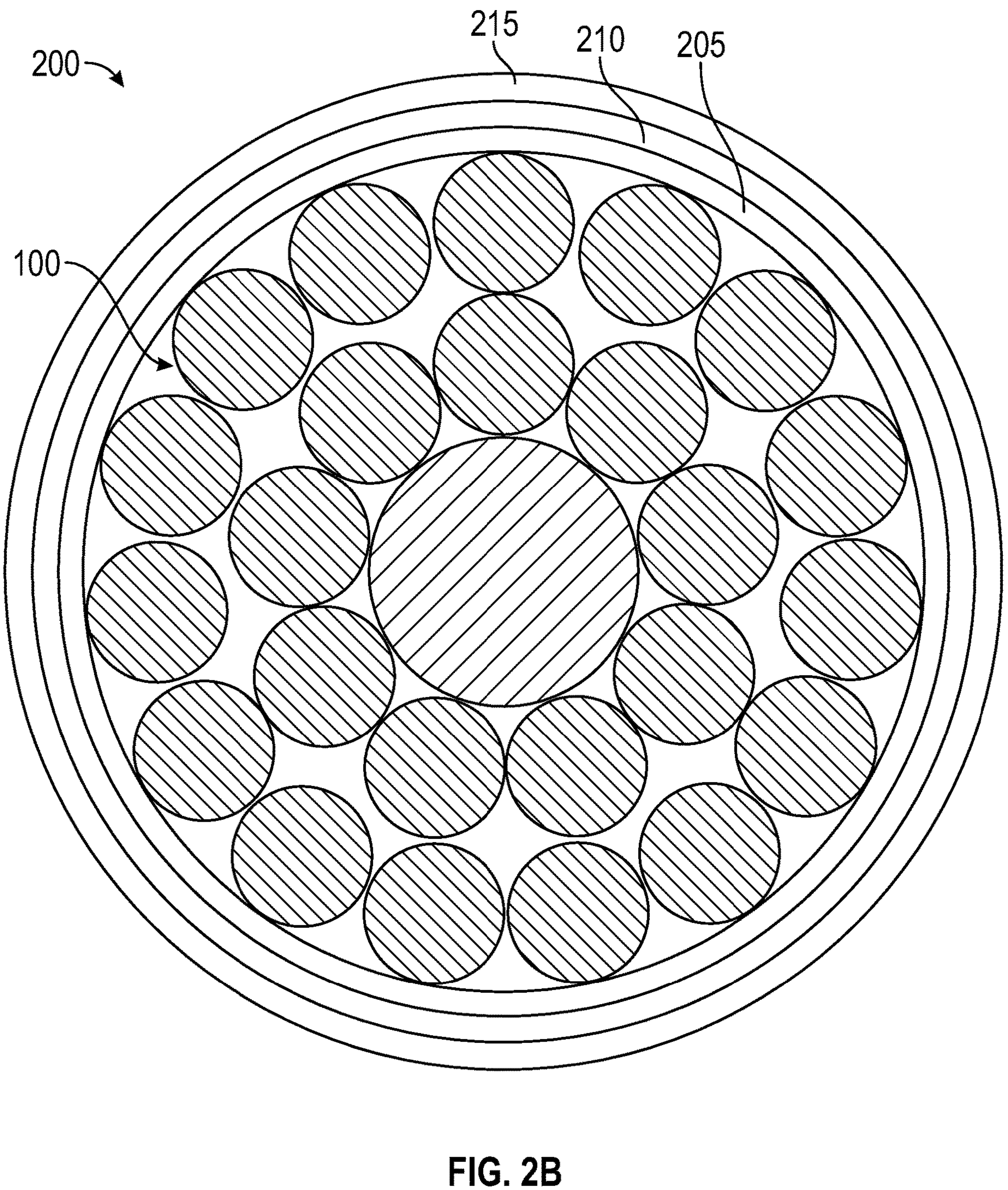
FIG. 2B shows a tree wire with a solid core.

FIG. 2A illustrates a tree wire 200 comprising conductor 100 and a plurality of covering layers that may be extruded on to conductor 100. The plurality of covering layers may comprise, but are not limited to, a conductor shield 205, an inner layer 210, and an outer layer 215. Any of the plurality of covering layers may comprises, but are not limited to, High-Density Polyethylene (HDPE), Cross-Linked Polyethylene (XLPE), Semi-conducting cross linked polymer, Low-Density Crosslinked Polyethylene (LDXLPE), or High-Density Track-Resistant Crosslinked Polyethylene (HDTRXLPE). For example, conductor shield 205 may comprise semi-conducting cross linked polymer, inner layer 210 may comprise LDXLPE, and outer layer 215 may comprise HDTRXLPE. FIG. 2B illustrates tree wire 200, however, core 115 may be one solid strand made from the same material as described above with respect to outer core strands 125 and center strand 120.

FIG. 2A shows three covering layers, but tree wire 200 may comprise any number of covering layers and is not limited to three. Covering layer thickness may depend, for example, on the voltage of an electric power distribution system in which tree wire 200 is utilized. Tree wire 200 may be designed for full span applications and may be supported on the electric power distribution system on polyethylene insulators for example.

Consistent with embodiments of the disclosure, first conductor layer 105 (e.g., comprising first conductor layer strands 130) and second conductor layer 110 (e.g., comprising second conductor layer strands 135) may comprise a material that may anneal at a temperature above an operating temperature range of tree wire 200. For example, per published standards (e.g., American National Standards Institute (ANSI)/Insulated Cable Engineers Association (ICEA) Publication S-70-547-2016), tree wire 200 may have a rated operating temperature upper end range of 90 degrees Celsius continuous and a maximum 130 degrees Celsius emergency rating not to exceed 1,000 hours for the life of tree wire 200.

First conductor layer 105 and second conductor layer 110 may comprise aluminum zirconium alloy. The aluminum zirconium alloy may be between 0.20% and 0.33% zirconium inclusively. Aluminum zirconium alloy, for example, may not begin to anneal until it reaches a temperature of 230 degrees Celsius. In contrast, ACSR tree wire using 1350-H19 aluminum may operate at a temperature of about 90 degrees Celsius up to 130 degrees Celsius. However, 1350-H19 aluminum begins to anneal at about 93 degrees Celsius, and thus, a long-term strength loss may be realized from routine operation above 93 degrees Celsius because ACSR tree wire may routinely operate above 93 degrees Celsius to a maximum of 130 degrees Celsius. Accordingly, using aluminum zirconium alloy (i.e., AlZr) for first conductor layer 105 and second conductor layer 110 may eliminate the possibility of long-term strength loss in tree wire 200 because the annealing temperature of aluminum zirconium alloy may be about 100 degrees Celsius greater than the emergency operating temperature of 1350-H19 aluminum. In other words, using aluminum zirconium alloy instead of 1350-H19 aluminum for conductors having a rated operating temperature upper end range of 90 degrees Celsius continuous and a maximum 130 degrees Celsius emergency rating not to exceed 1,000 hours may eliminate the possibility of long-term strength loss because the annealing temperature of aluminum zirconium alloy may be about 100 degrees Celsius greater than the emergency operating temperature 1350-H19 aluminum.

Figure 3:
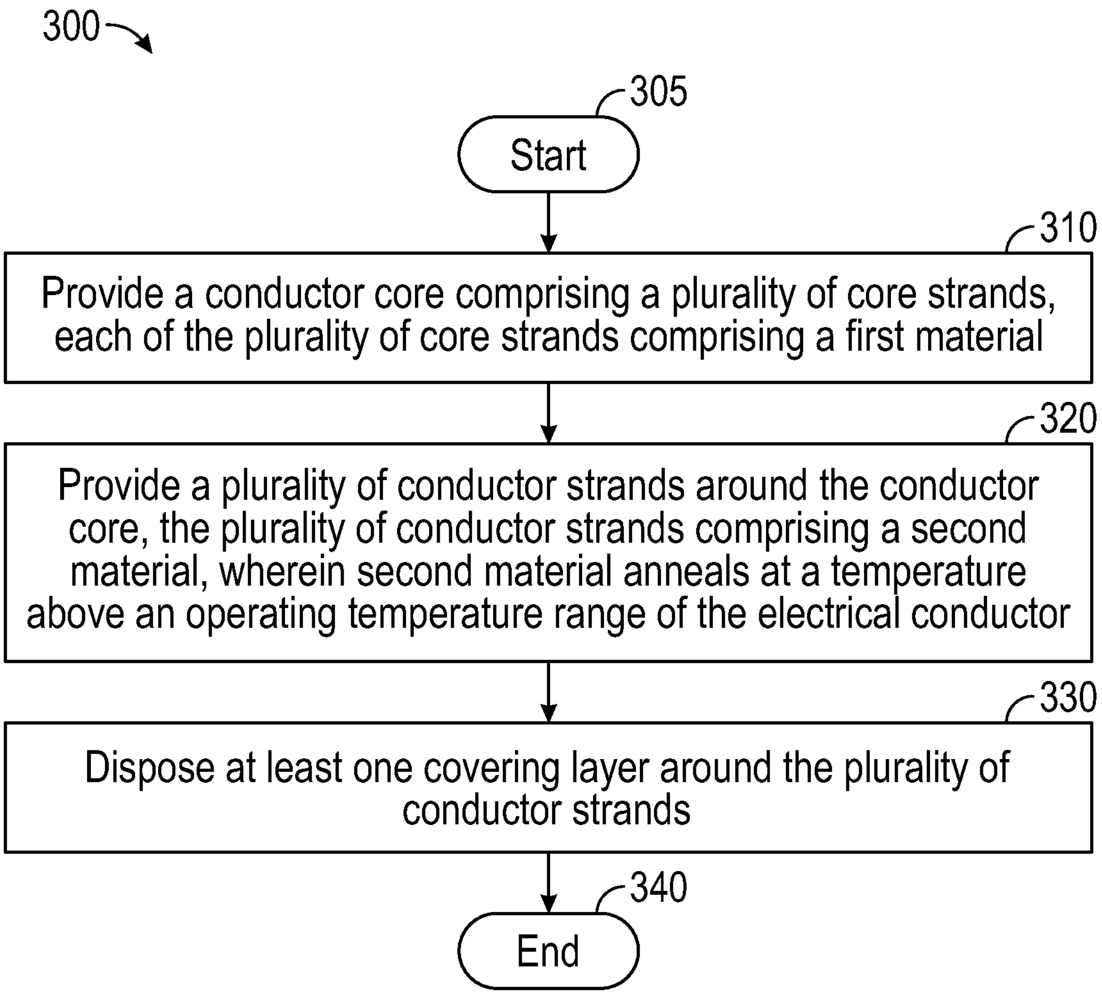
FIG. 3 shows a method for providing high annealing temperature tree wire.

FIG. 3 is a flow chart setting forth the general stages involved in a method 300 consistent with an embodiment of the disclosure for providing high annealing temperature tree wire. Ways to implement the stages of method 300 will be described in greater detail below.

Method 300 may begin at starting block 305 and proceed to stage 310 where conductor core 115 comprising plurality of core strands 125 and a center strand 120 may be provided. Each of plurality of core strands 125 and center strand 120 may comprising first material. For example, the first material may comprise, but is not limited to, high strength steel, HS 285 steel, or standard strength steel. Plurality of core strands 125 may comprise center strand 120 with a plurality of outer core strands helical wrapped around center strand 120. Consistent with embodiments of the disclosure, core 115 may comprise one single solid strand instead of plurality of core strands 125 and center strand 120.

From stage 310, where conductor core 115 comprising the plurality of core strands are provided, method 300 may advance to stage 320 where a plurality of conductor strands (e.g., first conductor layer strands 130 and second conductor layer strands 135) may be provided around conductor core 115. The plurality of conductor strands may comprise a second material. The second material may anneal at a temperature above an operating temperature range of the electrical conductor. For example, the temperature above the operating temperature range of the electrical conductor may be greater than or equal to 210 degrees Celsius. An upper end of the operating temperature range of the electrical conductor may comprise 90 degrees Celsius. The second material may comprise an aluminum zirconium alloy that may be between 0.20% and 0.33% zirconium inclusively. Each of the plurality of conductor strands may have a trapezoidal cross-sectional shape or may be compacted. The plurality of conductor strands may comprise a second conductor layer helical wrapped around a first conductor layer.

The first conductor layer and second conductor layer may be wrapped in respective alternating hand lay.

Once the plurality of conductor strands is provided around conductor core 115 in stage 320, method 300 may continue to stage 330 where at least one covering layer may be disposed around the plurality of conductor strands. For example, the at least one covering layer may comprise one of High-Density Polyethylene (HDPE) and Cross-Linked Polyethylene (XLPE). Once the at least one covering layer is disposed around the plurality of conductor strands in stage 330, method 300 may then end at stage 340.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An electrical conductor comprising:

a conductor core comprising a center strand with a plurality of outer core strands helically wrapped around the center strand, both the center strand and the plurality of outer core strands comprising a first material;

a plurality of conductor strands wrapped around the conductor core, the plurality of conductor strands comprising a second material, wherein the second material anneals at a temperature above an operating temperature range of the electrical conductor, wherein the second material comprises an aluminum zirconium alloy including between 0.20% and 0.33% zirconium, and wherein the temperature above the operating temperature range of the second material is greater than or equal to 210 degrees Celsius; and at least one covering layer disposed around the plurality of conductor strands.

2. The electrical conductor of claim 1, wherein the first material comprises High Strength (HS) steel.

3. The electrical conductor of claim 1, wherein the first material comprises Ultra-High Strength Steel (UHS/HS285).

4. The electrical conductor of claim 1, wherein the first material comprises Standard Strength Steel.

5. The electrical conductor of claim 1, wherein an upper end of the operating temperature range of the electrical conductor is 90 degrees Celsius.

6. The electrical conductor of claim 1, wherein the at least one covering layer comprises one of High-Density Polyethylene (HDPE) and Cross-Linked Polyethylene (XLPE).

7. The electrical conductor of claim 1, wherein each of the plurality of conductor strands has a trapezoidal cross-sectional shape.

8. The electrical conductor of claim 1, wherein each of the plurality conductor strands are compacted.

9. The electrical conductor of claim 1, wherein the plurality of conductor strands comprises a second conductor layer helically wrapped around a first conductor layer.

10. The electrical conductor of claim 9, wherein the first conductor layer and second conductor layer are wrapped in respective alternating hand lay.

11. An electrical conductor comprising:

a conductor core comprising a center strand with a plurality of outer core strands helically wrapped around the center strand, both the center strand and the plurality of outer core strands comprising a first material; and a plurality of conductor strands wrapped around the conductor core, the plurality of conductor strands comprising a second material, wherein the second material anneals at a temperature above an operating temperature range of the electrical conductor, wherein the second material comprises an aluminum zirconium alloy between 0.20% and 0.33% zirconium inclusively, and wherein an upper end of the operating temperature range of the electrical conductor is 90 degrees Celsius.

12. The electrical conductor of claim 11, further comprising at least one covering layer disposed around the plurality of conductor strands.

13. The electrical conductor of claim 11, wherein the temperature above the operating temperature range of the electrical conductor is greater than or equal to 210 degrees Celsius.

14. A method for providing an electrical conductor, the method comprising:

providing a conductor core comprising a center strand with a plurality of outer core strands helically wrapped around the center strand, both the center strand and the plurality of outer core strands comprising a first material;

providing a plurality of conductor strands around the conductor core, the plurality of conductor strands comprising a second material, wherein the second material anneals at a temperature above an operating temperature range of the electrical conductor, wherein the second material comprises an aluminum zirconium alloy including between 0.20% and 0.33% zirconium inclusively, and wherein the temperature above the operating temperature range of the second material is greater than or equal to 210 degrees Celsius; and disposing at least one covering layer around the plurality of conductor strands.

15. The method of claim 14, wherein an upper end of the operating temperature range of the electrical conductor is 90 degrees Celsius.

16. Method of claim 14, wherein each of the plurality of conductor strands has a trapezoidal cross-sectional shape.

17. Method of claim 16, wherein the plurality of core strands comprises a center strand with a plurality of outer core strands helically wrapped around the center strand.

18. The method of claim 14, wherein the plurality of conductor strands comprises a second conductor layer helically wrapped around a first conductor layer.

19. The method of claim 18, wherein the first conductor layer and second conductor layer are wrapped in respective alternating hand lay.

20. The method of claim 14, wherein the at least one covering layer comprises one of High-Density Polyethylene (HDPE) and Cross-Linked Polyethylene (XLPE).

21. The method of claim 14, wherein each of the plurality conductor strands are compacted.

22. The method of claim 14, wherein the first material comprises High Strength (HS) steel.

* * * * *